(12) United States Patent
Edwards et al.

(10) Patent No.: US 8,321,501 B2
(45) Date of Patent: Nov. 27, 2012

(54) SECURE OUT-OF-BAND STORAGE CONTROL

(75) Inventors: David A. Edwards, Camron Park, CA (US); Hormuzd M. Khosravi, Portland, OR (US); Yasser Rasheed, Beaverton, OR (US); Divya Naidu Kolar Sunder, Hillsboro, OR (US); Josephe E. Clark, Diamond Springs, CA (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 12/646,692

(22) Filed: Dec. 23, 2009

(65) Prior Publication Data

US 2011/0153725 A1    Jun. 23, 2011

(51) Int. Cl.
*G06F 15/16* (2006.01)
(52) U.S. Cl. .................... 709/203; 709/223; 710/313
(58) Field of Classification Search .............. 709/203, 709/219, 209; 710/313
See application file for complete search history.

(56) References Cited

U.S. PATENT DOCUMENTS

| | | | |
|---|---|---|---|
| 7,734,753 B2* | 6/2010 | Hickman et al. | 709/223 |
| 2002/0103987 A1* | 8/2002 | Jaffrey | 712/32 |
| 2003/0101239 A1* | 5/2003 | Ishizaki | 709/219 |
| 2003/0196136 A1* | 10/2003 | Haynes et al. | 714/13 |
| 2005/0066225 A1* | 3/2005 | Rowan et al. | 714/5 |
| 2007/0169173 A1* | 7/2007 | Brown et al. | 726/2 |
| 2008/0313364 A1* | 12/2008 | Flynn et al. | 710/31 |
| 2009/0063747 A1* | 3/2009 | Bagepalli et al. | 710/313 |
| 2009/0324137 A1* | 12/2009 | Stallings et al. | 382/306 |
| 2010/0287365 A1* | 11/2010 | Watkins et al. | 713/2 |
| 2011/0145618 A1* | 6/2011 | Andresen et al. | 713/330 |

* cited by examiner

*Primary Examiner* — Tesfay Yohannes
(74) *Attorney, Agent, or Firm* — Schwabe, Williamson & Wyatt, P.C.

(57) ABSTRACT

Embodiments of the present disclosure provide methods and computing devices configured to establish secure out-of-band storage control. In various embodiments, a management module in a client device may be used to communicate with a server device independent of an operating system of the client device, to facilitate remote storage services. Other embodiments may be disclosed and claimed.

19 Claims, 6 Drawing Sheets

SECURE OUT-OF-BAND STORAGE CONTROL

FIELD

Embodiments of the present disclosure relate to the field of data processing, particularly relate to techniques for secure out-of-band storage control.

BACKGROUND

Online storage services such as data backup and recovery, anti-virus scan, disk repair, removal of malware and so forth, are currently broadly available to client computers through communication with remote network servers on which storage tools are installed. The communication between the client computers and remote servers is typically established using software agents installed on the client computers. However, such software agents are not always readily installed and may be shut down or infected by virus or malware on the client computers.

Also, current online storage services and software agents are dependent on the operating system of the client computers. Thus, when the operating system is impaired or paralyzed, the remote servers will lose the opportunity to access the mass storage of the client computers and cannot provide the online storage services to the client computers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A and/or B" means "(A), (B), or (A and B)." For the purposes of the present disclosure, the phrase "A, B, and/or C" means "(A), (B), (C), (A and B), (A and C), (B and C), or (A, B and C)."

Various logic blocks may be introduced and described in terms of an operation provided by the blocks. These logic blocks may include hardware, software, and/or firmware elements in order to provide the described operations. While some of these logic blocks may be shown with a level of specificity, e.g., providing discrete elements in a set arrangement, other embodiments may employ various modifications of elements/arrangements in order to provide the associated operations within the constraints/objectives of a particular embodiment.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Storage services herein include but not limited to data backup and recovery, disk repair, anti-virus scan and malware removal, installation of security systems, and system performance optimization, etc.

The term "out-of-band" is used herein to describe communication independent from a main stream, such as communication between a server device and a management module of a client device that is conducted independent of the operating system (OS) of the client device.

Figure 1:
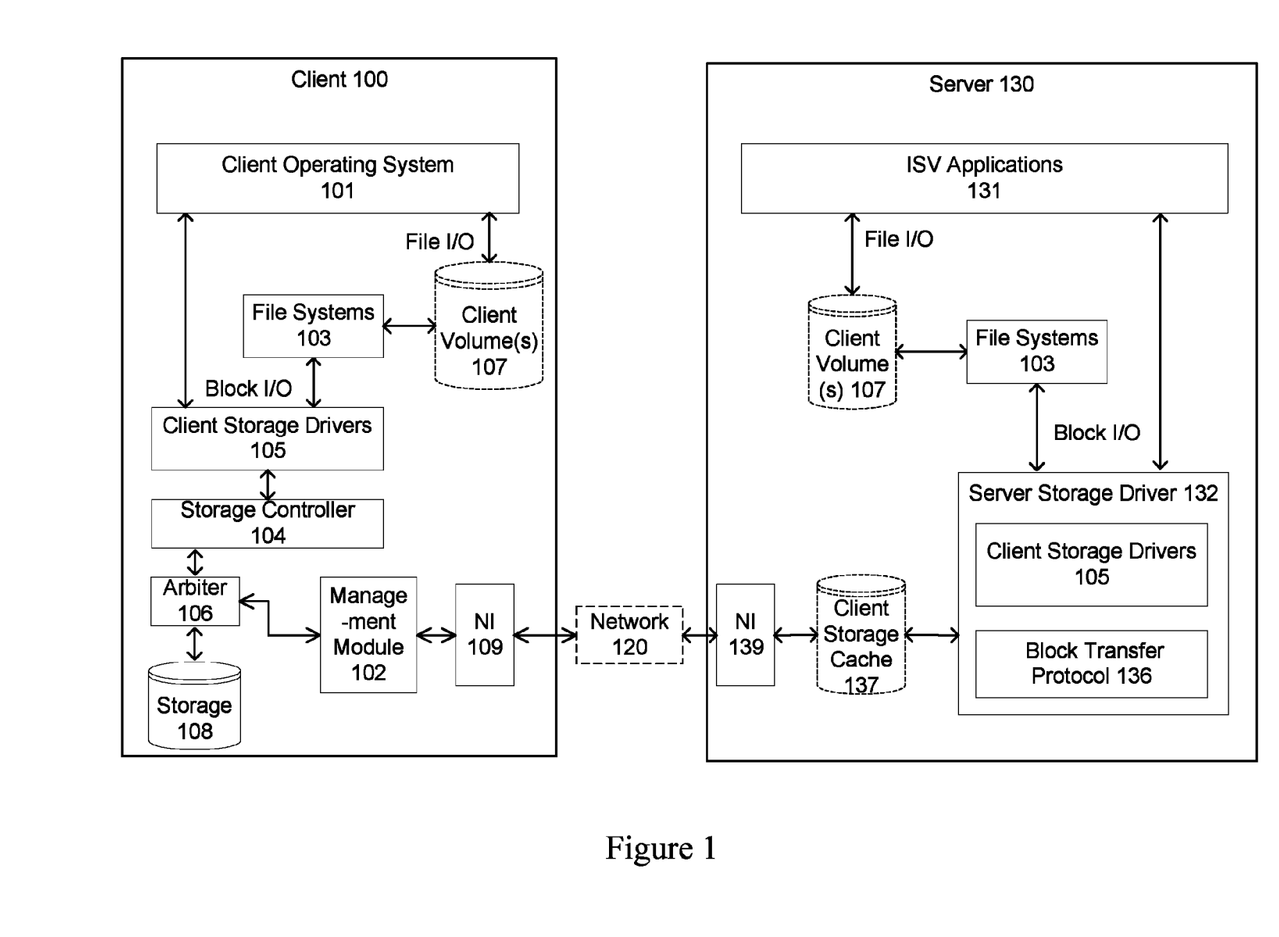
FIG. 1 illustrates a system including a client and a server device in accordance with various embodiments of the present disclosure.

FIG. 1 illustrates a system including a client device 100 and a server 130 device in accordance with various embodiments, where server device 130 may be configured to provide storage services to client device 100. In various embodiments, server device 130 may communicate with client device 100 over a network 120. In various embodiments, network 120 may comprise one or more private and/or public networks, including e.g. the Internet.

In various embodiments, client device 100 may include a client operating system (OS) 101 installed on a client volume 107 and may have an associated file system 103. In various embodiments, client device 100 may have a basic input and output system (BIOS) (not shown) configured to provide low level system services for client device 100, including but not limited to boot up service.

In various embodiments, client volume 107 and file system 103 may be located in a mass storage device 108. In various embodiments, mass storage 108 may be controlled by client OS 101 via a storage controller 104. In one embodiment, mass storage 108 may be a hard drive disk (HDD) and storage controller 104 may be an advanced host controller interface (AHCI) controller.

In various embodiments, client device 100 may have a plurality of client storage drivers 105 which may be configured to facilitate client OS 101 to control mass storage 108 and format data stored thereon. In various embodiments, client storage drivers 105 may include but are not limited to Intel rapid storage technology (iRST), software based full disk encryption (SW FDE), and Microsoft AHCI drivers.

In various embodiments, client device 100 may further include a management module 102 coupled with a network interface 109. In various embodiments, network interface 109 may be configured to couple client device 100 to network 120. In various embodiments, client OS 101 may be coupled to network 120 through management module 102 and network interface 109. In one embodiment, management module 102 may comprise a manageability engine (ME) in a chipset and may have firmware installed thereon.

In various embodiments, management module 102 may include an interface to communicate with the BIOS of the client device, and may also include another interface configured to communicate with storage controller 104.

In various embodiments, client device 100 may include an arbiter 106 coupled with management module 102, storage controller 104 and mass storage 108. In various embodiments, arbiter 106 may be configured to arbitrate between management module 102 and storage controller 104 regarding the control of mass storage 108.

In various embodiments, arbiter 106 may be configured to acquire status information of client OS 101, in response to receiving access requests from management module 102, and give partial or full control of mass storage 108 to management module 102 based upon the status of client OS 101. In various embodiments, arbiter 106 may be configured to acquire the status information of client OS 101 from the BIOS of the client device. In various embodiments, client storage drivers 105 may not be aware of arbiter 106.

In various embodiments, arbiter 106 may be configured to receive requests from management module 102 for accessing mass storage 108, and may be configured to notify storage driver 105 about the requests. In various embodiments, arbiter 106 may be configured to conditionally allow management module 102 to access mass storage 108 based at least in part on the status information of client OS 101 and/or feedbacks from client storage drivers 105.

In various embodiment, arbiter 106 may be configured to only allow management module 102 to read data from but not write data to mass storage 108, when client OS 101 is active. In alternative embodiments, arbiter 106 may be configured to allow management module 102 to take over control of mass storage 108 to read and write data, when client OS 101 is inactive.

Figure 2:
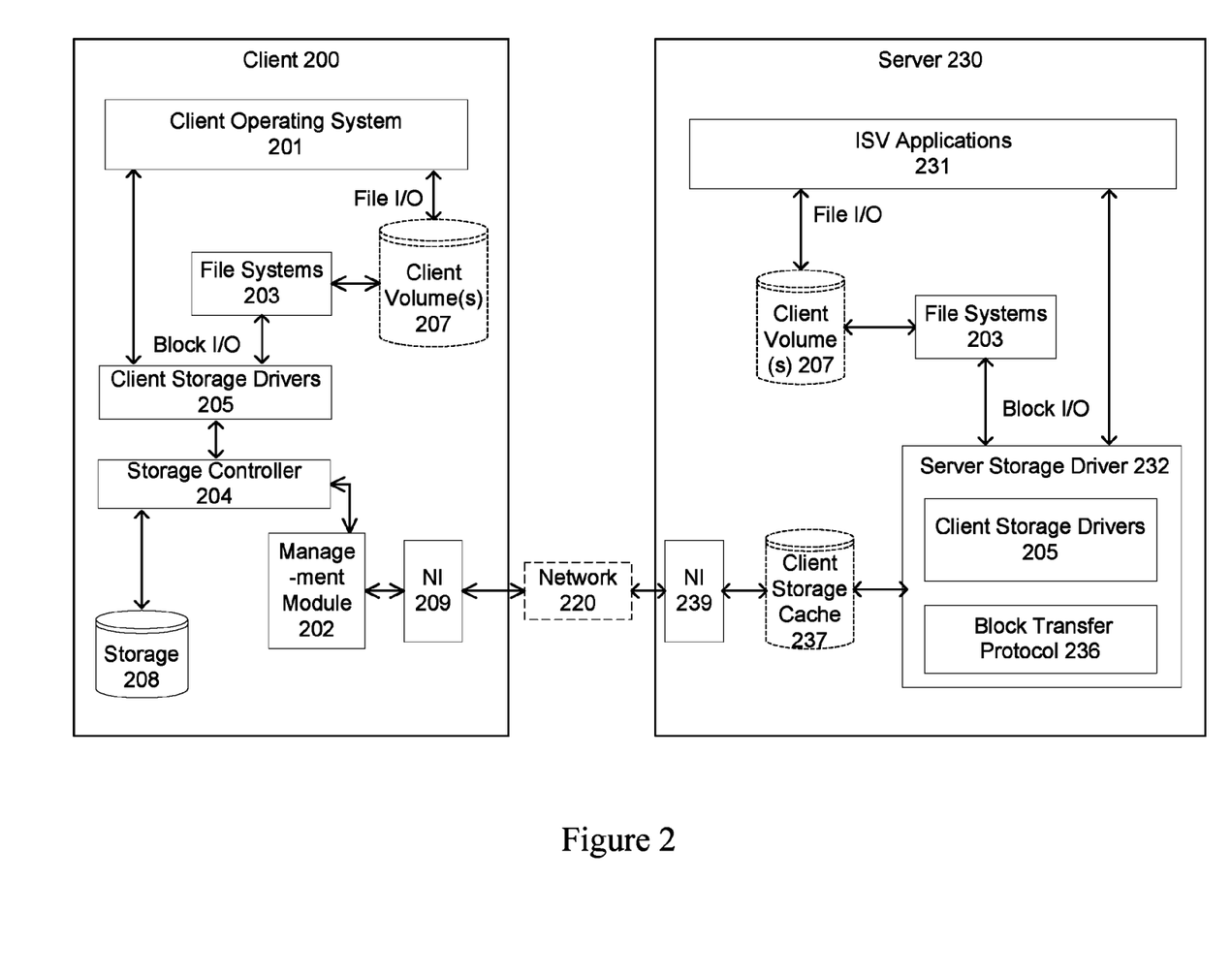
FIG. 2 illustrates another system including a client and a server device in accordance with various embodiments of the present disclosure.

FIG. 2 shows a system including client device 200 and a server device 230 in accordance with various embodiments. As illustrated in FIG. 2, management module 202 may be coupled with storage controller 204. In various embodiments, storage controller 204 may be configured to perform handshake with client storage drivers 205. In various embodiments, storage controller 204 may include an arbiter configured to obtain the status information of client OS 201 and facilitate communication regarding access of mass storage 208 between client storage drivers 205 and management module 202. In various embodiments, client storage drivers 205 may include a particular interface to communicate with the arbiter in storage controller 204. In alternative embodiments, the arbiter may be included in management module 202.

Figure 3:
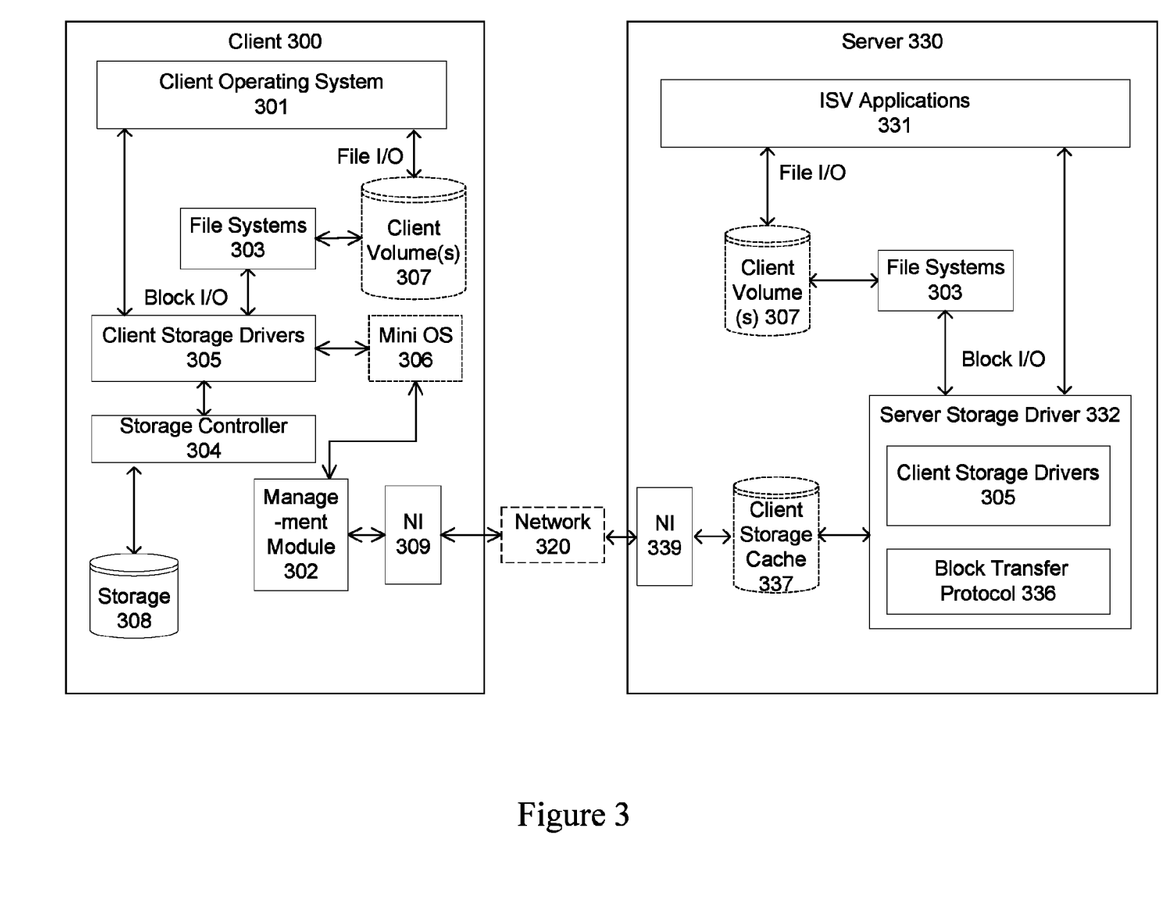
FIG. 3 illustrates another system including a client and a server device in accordance with various embodiments of the present disclosure.

FIG. 3 shows a system including a client device 300 and a server device 330 device in accordance with various embodiments. In various embodiments, management module 302 may be coupled to client storage drivers 305. In one embodiment, client device 300 may include an arbiter 306 configured to couple management module 302 to client storage drivers 305. In various embodiments, arbiter 306 may be configured to support client storage drivers 305 even when client OS 301 is inactive due to various reasons, so that management module 302 may still be enabled to control mass storage 308 through client storage drivers 305. In various embodiments, arbiter 306 may be configured to facilitate communication between management module 302 and client storage drivers 305 regarding accessing mass storage 308. In various embodiments, client storage drivers 305 may include drivers related to the format and layout of raw data stored on mass storage 308. In various embodiments, arbiter 306 may be a mini OS and status of the mini OS may be unrelated to the status of client OS 301. In various embodiments, management module 302 may be part of the mini OS.

Server devices illustrated in FIGS. 1-3 may be the same, therefore service device 130 is selected as a representative and described in details as following. In various embodiments, a plurality of storage tools, such as independent software vendor (ISV) applications 131 may be installed on server device 130 to provide storage services to client device 100. In various embodiments, server device 130 may further include a network interface 139 coupled with network 120.

In various embodiments, server device 130 may include a server storage driver 132 which may be configured to facilitate ISV applications 131 to provide storage services to client device 100. In various embodiments, server storage driver 132 may include a replicate of client storage drivers 105. In various embodiments, server storage driver 132 may include a partial replicate of client storage drivers 105 configured to format data stored on mass storage 108. In various embodiments, server storage driver 132 may also include a block transfer module configured to communicate with the client device using a block transfer protocol 136 for transferring data blocks with client device 100. In various embodiments, block transfer protocol 136 may be defined by client device 100.

As illustrated in FIG. 1, server device 130 may further include a replicate of client volume 107 and associated file system 103 of client device 100. In various embodiments, server device 130 may include a client storage cache 137 coupled between server storage driver 132 and network interface 139 of server device 130. In various embodiments, data read from or written to the client device may be cached in client storage cache 137 and client storage cache 137 may be configured to handle cache requests from server storage driver so that server device 130 may not have to access client device 100 for each of the cache requests. In various embodiments, client storage cache may be constituted with non-volatile flash memory, e.g., NAND flash memory.

In various embodiments, ISV applications 131 may be executed to create, update or otherwise manage the replicate of client volume 107 using the replicate of client storage drivers 105. In various embodiments, the replicate of client storage drivers 105 may particularly include drivers related to format and data layout of raw data stored on mass storage 108 of client device 100. In one embodiment, the raw data may be encrypted and the replicate of client storage drivers 105 may include one or more drivers to decrypt the raw data. In various embodiments, ISV applications 131 may be executed to identify problems existing on mass storage 108 and generate solutions to fix the problems. In various embodiments, server device 130 may be configured to provide data and instructions resulted from execution of ISV applications 131 to client device 100 through network interface 139 in accordance with block transfer protocol 136.

Figure 4:
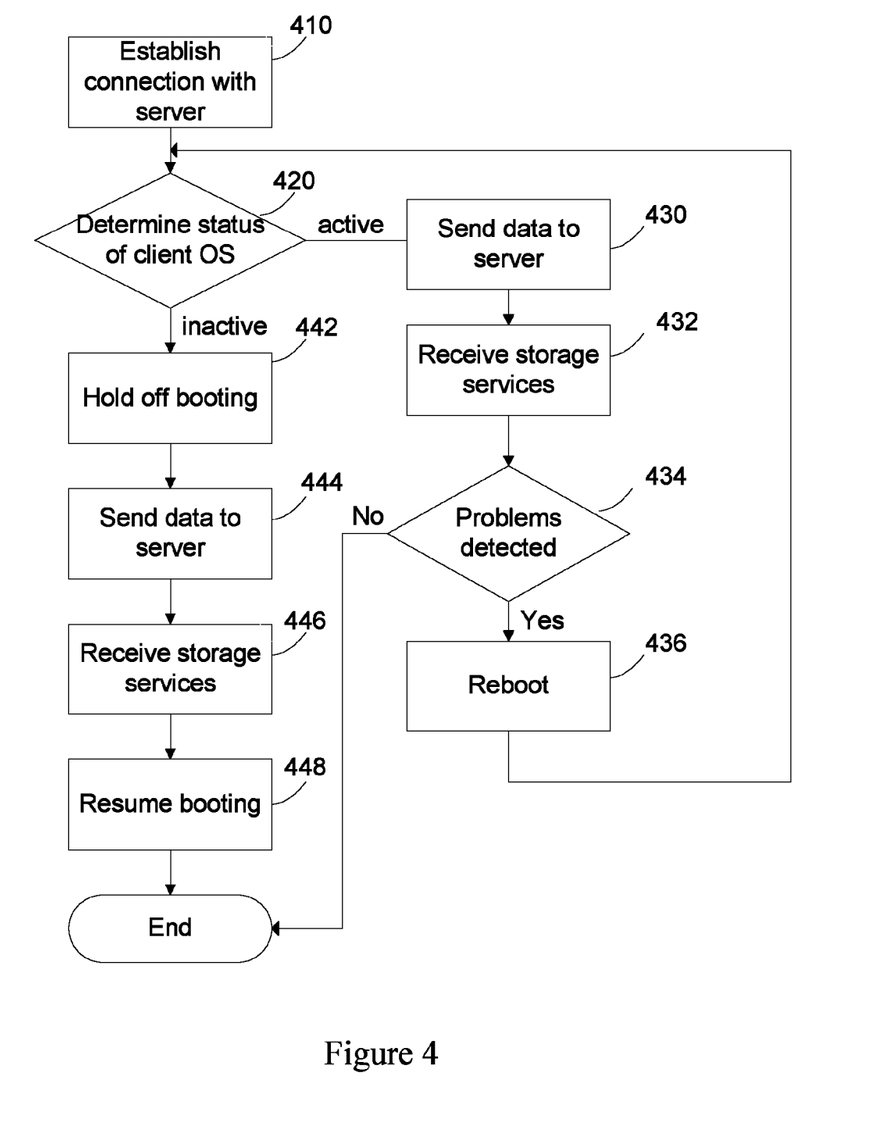
FIG. 4 illustrates a method for a client device to communicate with a server device in accordance with various embodiments of the present disclosure.

FIG. 4 is a flowchart depicting a method for a client device to communicate with a server device to provide storage services to a mass storage of the client device in accordance with various embodiments. At block 410, client device may be configured to establish connection with a server device. In various embodiments, the connection may be established through exchanging credentials between the client and server devices for security considerations. In various embodiments, the client device may be configured to send a request for storage services to the server device. In alternative embodiments, the client device may be configured to receive an access request from the service device.

In various embodiments, at block 420, the client device may be configured to determine a status of an OS of the client device. In one embodiment, a management module of the client device may be configured to communicate with the BIOS of the client device to acquire status information of the OS. In an alternative embodiment, one or more client storage drivers may be configured to provide the management module the status information of the OS. In various embodiments, a status of the one or more client storage drivers may be polled by the management module regularly and the management module may be configured to assume that the OS is inactive when the one or more client storage drivers do not respond.

In various embodiments, the status of the OS may be determined to be active. Then the process may be directed to block 430, where a management module of the client device may be configured to provide data stored on the mass storage to the server device independent of the OS. In various embodiments, the data may be requested by the server device in order to provide storage services.

In various embodiments, at block 432, the client device may operate to receive data and commands from the server device providing storage services. In various embodiments, storage services provided to the mass storage may involve read operations only because the client OS is active, since write operations may cause conflict with the storage device accesses managed by the client OS.

In various embodiments, at block 434, the client device may be informed that there are problems existing in the mass storage and the client device may be instructed to be rebooted so that the server device can perform write operations in order to fix the problems.

In various embodiments, at block 436, the client device may be configured to reboot itself and the process may be directed back to block 420 for determination of the status of client OS.

In alternative embodiments, at block 434, the client device may be informed that there are no problems existing in the mass storage, and the process may be directed to an end.

In various embodiments, the client OS may be determined to be inactive at block 420. In one embodiment, booting of the client device may not be completed yet. In various embodiments, at block 442, the client device may be configured to hold off the booting and the management module of the client device may be configured to take control of the mass storage. In alternative embodiments, the client device may be in a low power "sleep" mode or be powered down. In various embodiments, the client device may be remotely powered up and the process may be directed to block 442.

In various embodiments, at block 444 the client device may be configured to provide data stored on the mass storage to the server device in accordance with a data block transferring protocol. In various embodiments, the data may be requested by the server device. In various embodiments, the data block transferring protocol may be a protocol in addition to standard network communication protocols. In various embodiments, the data block transferring protocol may be defined by the client device.

In various embodiments, at block 446, the client device may operate to receive data and instructions from the server device to provide the storage services. In various embodiments, the client device may operate to perform write operations on the mass storage.

In various embodiments, at block 448, the management module of the client device may be configured to return control of the mass storage when the storage services are completed and the booting of the client device may be resumed.

Figure 5:
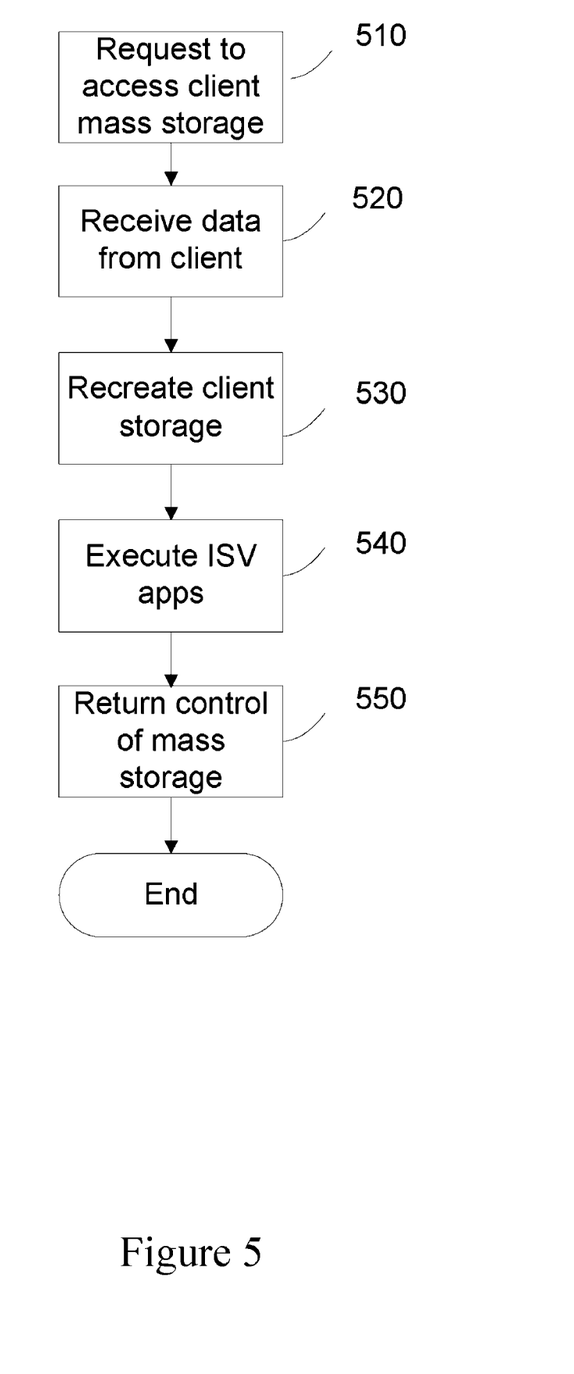
FIG. 5 illustrates a method for a server device to communicate with a client device in accordance with various embodiments of the present disclosure.

FIG. 5 is a flowchart depicting a method for a server device to provide storage services to one or more mass storage of a client device in accordance with various embodiments. At block 510, the server device may send a request to establish connection with the client device. In various embodiments, this request for connection may be based on a report from the client device requesting storage services. In various embodiments, the connection may be established through exchanging credentials between the client and server devices for security considerations.

In various embodiments, at block 520, the server device may be approved to connect to the client device and may be configured to request for and receive data stored on the one or more mass storage. In various embodiments, the server device may also be configured to receive status information of the client OS at block 520.

In various embodiments, at block 530, the server device may operate to recreate a replicate of a part of or the entire mass storage of the client device on a mass storage of the server device based on the data received from the client device. In various embodiments, the server device may further be configured to send one or more cache requests regarding the replicate of the mass storage to a storage cache located in the server device.

In various embodiments, at block 540, the server device may be configured to execute ISV applications to provide storage services to the client device. In various embodiments, the server device may be acknowledged that the OS of the client device is active. In various embodiments, the server device may be configured to execute the ISV applications to perform read only operations such as diagnosing.

In alternative embodiments, the server device may be informed that the OS of the client device is inactive. In various embodiments, the server device may be configured to instruct the client device to hold off booting and execute the ISV applications to provide storage services to the client device. In various embodiments, the server device may send data and instructions to provide storage services which may require write operations to the client device in accordance with the data block transferring protocol.

In various embodiments, at block 550, the server device may operate to instruct the client device to resume booting and return control of the mass storage to the client OS when the storage services are completed.

The devices and methods described herein may be used for theft deterrence. In various embodiments, the management module may be informed that the client device is stolen and may be configured to request for storage services from a server device. In various embodiments, the management module may be configured to send data stored on a mass storage of the client device to the server device without notifying an OS of the client device.

Figure 6:
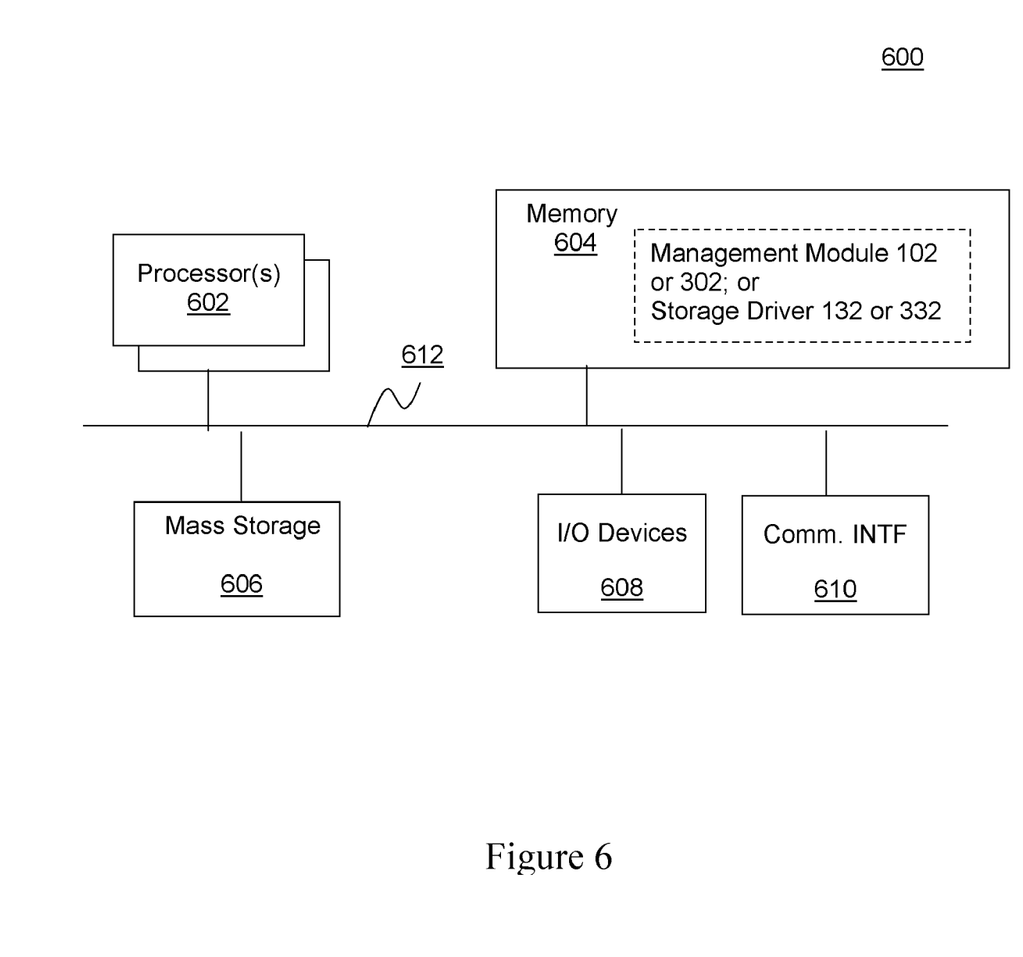
FIG. 6 illustrates an example computer system incorporated with teachings of the present disclosure.

FIG. 6 illustrates an example computer system suitable for use to practice various embodiments of the present invention. It may be a server or a client device to implement the plural applications, associated with the services that operate on the contents, threads and categories organized in accordance with the unified data model, and/or a security database. As shown, computing system 600 includes one or more processors 602, and tangible computer readable system memory 604. Additionally, computing system 600 includes tangible computer readable mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

System memory 604 and mass storage 606 may be employed to store a working copy and a permanent copy of the data and/or instructions associated with embodiments of the invention, e.g. management module 102, 202, or 302 or storage driver 132, 232, or 332, depending on whether example computer system is used as a client device or a server of the present disclosure. In various embodiments, management module 102, 202 or 302 or storage driver 132, 232 or 332 may be implemented as assembler instructions supported by processor(s) 602 or high level languages, such as C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)).

In accordance with various embodiments, a cluster of computing systems 600 may work together to distribute data and provide services to users, even remote ones.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Similarly, memory devices of the present disclosure may be employed in host devices having other architectures. This application is intended to cover any adaptations or variations of the embodiments discussed herein. Therefore, it is manifestly intended that embodiments in accordance with the present disclosure be limited only by the claims and the equivalents thereof.

What is claimed is:

1. A client device, comprising:
a mass storage device;
a storage controller coupled with the mass storage device to control access of the mass storage device;
   a processor coupled with the storage controller, and configured to execute an operating system (OS) configured to access the mass storage device through the storage controller;
   a networking interface configured to couple the client device with an external server device;
   a management module coupled with the networking interface, and configured to facilitate the server device in accessing the mass storage device, independent of the OS; and
   an arbiter coupled with the management module, and with the storage controller or the mass storage device, and configured to arbitrate access to the mass storage device by the storage controller or the management module, wherein the arbiter is further configured to acquire a current status of the OS and provide the management module with full or partial control of the mass storage device based on the status of the OS, wherein the networking interface is configured to facilitate access to an external network to which the server device is coupled, wherein the management module is configured to regulate access to the network interface, including access by the OS.

2. The client device of claim 1, wherein the arbiter is disposed in the storage controller.

3. The client device of claim 1, wherein the arbiter is disposed in the management module.

4. The client device of claim 1, wherein the management module is configured to assist the server device in reading data from or writing data to the mass storage device.

5. The client device of claim 1, wherein the management module is configured to determine a status of the OS of the client device.

6. The client device of claim 5, wherein the management module is further configured to cause booting of the client device to be held off if booting of the client device is not completed and the OS is in an inactive state while the server device accesses the mass storage device.

7. The client device of claim 1, wherein the management module is configured to transfer data blocks to or receive data blocks from the server device in accordance with a block transfer protocol.

8. The client device of claim 6, wherein the management module is configured to cause the booting of the client device to be resumed after the server device completes accessing the mass storage device, if the client device has not completed booting before the service device begins accessing the mass storage device.

9. A server device, comprising:
a network interface; and
a storage driver coupled to the network interface and configured to communicate over a network with a management module of a client device, to transfer data from or to a mass storage device of the client device through the management module independent of an operating system (OS) of the client device, wherein the OS has been determined to be inactive, and wherein the management module is provided full or partial control of the mass storage device by an arbiter of the client device based at least in part on an active or inactive status of the OS, wherein the management module is configured to regulate access by the client device to a network interface of the client device.

10. The server device of claim 9, wherein the storage driver comprises a block transfer module configured to communication with the management module of the client device in accordance with a block transfer protocol.

11. The server device of claim 9, further comprises a mass storage device, wherein the storage driver further comprises a plurality of replicated storage drivers of the client device, wherein the storage driver is configured to cooperate with a block transfer module to facilitate the server device to generate a replicate of data stored on the mass storage device of the client device on the mass storage device of the server device.

12. The server device of claim 9, further comprises a storage cache coupling the network interface of the server device to the storage driver, and configured to cache data read from or being written to the mass storage device of the client device.

13. A method, comprising:
receiving, by a management module through a network interface of a client device, from a server device external to the client device, a request to access a mass storage device of the client device, wherein the management module is configured to facilitate the server device to access the mass storage device independent of an operating system (OS) of the client device, wherein the management module is configured to regulate access, by the client device, to the network interface;

determining, by the management module of the client device, in response to the request to access the mass storage device, a status of the OS; and causing, by the management module of the client device, booting of the client device to be held off, on determining that the OS of the client device is inactive.

14. The method of claim 13, further comprises enabling, by the management module, the server device to read data from or write data into the mass storage device after holding off the booting of the client device.

15. The method of claim 14, further comprising causing, by the management module, the booting to resume, after the server device finished with accessing the mass storage device.

16. The method of claim 13, further comprises enabling, by the management module, the server device to read data from the mass storage device when the OS of the client device is determined to be active.

17. A method, comprising:

transmitting a request, by a storage driver of a server device, on behalf of a storage tool application installed on the server device, to a management module of a client device to request for one or more blocks of data stored in a mass storage device of the client device, wherein an operating system (OS) of the client device has been determined to be inactive, wherein the management module of the client device is configured to be able to receive and service the request independent of the OS, and wherein the management module is provided full or partial control of the mass storage device by an arbiter of the client device based at least in part on an active or inactive status of the OS, wherein the management module is configured to regulate access by the client device to a network interface of the client device;

receiving the one or more blocks of data by the storage driver of the server device, from the management module of the client device, and storing the received one or more blocks of data by the storage driver on the server device; and repeating the transmitting, receiving and storing by the storage driver to facilitate the storage tool application to function and generate a replicate of at least a selected amount of data stored on the mass storage device of the OS inactive client device, on a mass storage device of the server device.

18. The method of claim 17, further comprising requesting the management module of the client device to obtain selected data stored on the mass storage device of the client device.

19. The method of claim 18, wherein the transmitting, receiving and storing by the storage driver comprises performing the transmitting, receiving and storing by a block transfer module of the storage driver.

* * * * *